(12) United States Patent
Takahashi et al.

(10) Patent No.: US 11,466,707 B2
(45) Date of Patent: Oct. 11, 2022

(54) FLUID LEAKAGE DETECTION SYSTEM AND FLUID PRESSURE SYSTEM

(71) Applicant: KYB Corporation, Tokyo (JP)

(72) Inventors: Yusuke Takahashi, Gifu (JP); Takahiro Iwamoto, Kanagawa (JP); Keitaro Yoshida, Kanagawa (JP); Takayoshi Kikuchi, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 16 days.

(21) Appl. No.: 16/967,615

(22) PCT Filed: Apr. 23, 2019

(86) PCT No.: PCT/JP2019/017144
§ 371 (c)(1),
(2) Date: Aug. 5, 2020

(87) PCT Pub. No.: WO2019/212003
PCT Pub. Date: Nov. 7, 2019

(65) Prior Publication Data
US 2021/0270296 A1     Sep. 2, 2021

(30) Foreign Application Priority Data

May 1, 2018   (JP) .............................. JP2018-088381

(51) Int. Cl.
*F15B 20/00*     (2006.01)
*F15B 15/14*     (2006.01)
*G01M 3/26*      (2006.01)

(52) U.S. Cl.
CPC ........ *F15B 20/005* (2013.01); *F15B 15/1423* (2013.01); *G01M 3/26* (2013.01)

(58) Field of Classification Search
CPC .... G01M 3/3263; G01M 3/16; G01M 3/2846; G01M 3/2869; G01M 3/2815
See application file for complete search history.

(56) References Cited

U.S. PATENT DOCUMENTS 3,438,246 A * 4/1969 Lotti ................ G01M 3/00
73/40
3,466,642 A * 9/1969 Terramorsi ............ G01M 3/181
340/522

(Continued)

FOREIGN PATENT DOCUMENTS

| CN | 104440758 A | * | 3/2015 | ............... F17D 5/02 |
| JP | 2007263584 A | * | 10/2007 | |
| JP | 2016-045068 A | | 4/2016 | |

OTHER PUBLICATIONS

ESPACENET Machine Translation of JP 2016-045068 A Which Originally Published on Apr. 4, 2016. (Year: 2016).*

(Continued)

*Primary Examiner* — David A. Rogers
(74) *Attorney, Agent, or Firm* — Rabin & Berdo, P.C.

(57) ABSTRACT

A fluid leakage detection system has a detection space to which working oil leaked out through a rod seal is guided; the rod seal being configured to seal an annular gap between a piston rod and a cylinder head; a sensor unit configured to detect pressure in the detection space; and a controller configured to acquire detected result from the sensor unit, wherein the controller has: a calculation unit configured to calculate a pressure parameter representing a pressure fluctuation in the detection space; a determination unit configured to determine occurrence of leakage of the working oil based on the pressure parameter; and the pressure parameter includes an upper limit value and a lower limit value of the pressure fluctuation obtained from the detected result detected by the sensor unit within a predetermined detection period.

8 Claims, 7 Drawing Sheets

(56) References Cited

U.S. PATENT DOCUMENTS

| | | | | |
|---|---|---|---|---|
| 3,789,297 A * | 1/1974 | Frolich | G01M 3/184 | |
| | | | 324/694 | |
| 3,956,604 A * | 5/1976 | Larker | B21C 31/00 | |
| | | | 200/61.08 | |
| 4,993,256 A * | 2/1991 | Fukuda | G01M 3/3236 | |
| | | | 340/605 | |
| 5,072,622 A * | 12/1991 | Roach | G01M 3/283 | |
| | | | 73/40.5 R | |
| 5,090,234 A * | 2/1992 | Maresca, Jr. | G01M 3/2892 | |
| | | | 73/40.5 R | |
| 5,176,230 A * | 1/1993 | Odot | B60L 5/205 | |
| | | | 191/87 | |
| 5,232,251 A * | 8/1993 | Gaughan | F16L 51/025 | |
| | | | 285/301 | |
| 5,261,268 A * | 11/1993 | Namba | G01M 3/2807 | |
| | | | 73/40.5 R | |
| 5,272,911 A * | 12/1993 | Beggs | G01M 99/00 | |
| | | | 73/47 | |
| 5,303,960 A * | 4/1994 | Gaughan | F16L 51/025 | |
| | | | 285/301 | |
| 5,911,209 A * | 6/1999 | Kouda | F02M 25/0809 | |
| | | | 123/520 | |
| 6,688,338 B2 * | 2/2004 | Meli | F16L 13/0272 | |
| | | | 138/123 | |
| 7,690,246 B1 * | 4/2010 | Discenzo | G01N 33/30 | |
| | | | 73/53.05 | |
| 7,860,683 B2 * | 12/2010 | Kunze | F04B 51/00 | |
| | | | 702/184 | |
| 7,881,852 B2 * | 2/2011 | Heinrich | G01M 3/025 | |
| | | | 701/102 | |
| 8,205,484 B2 * | 6/2012 | Sasaki | G01M 3/3263 | |
| | | | 73/46 | |
| 9,404,445 B2 * | 8/2016 | Furuhata | F02M 25/0809 | |
| 10,272,993 B2 * | 4/2019 | Fazeli | B64F 5/40 | |
| 10,352,814 B2 * | 7/2019 | Enev | E03B 7/071 | |
| 10,405,416 B2 * | 9/2019 | Hoffmann | H05G 1/06 | |
| 10,677,380 B1 * | 6/2020 | Surjaatmadja | F04B 15/00 | |
| 2012/0304855 A1 * | 12/2012 | Funato | F15B 15/1452 | |
| | | | 92/172 | |

OTHER PUBLICATIONS

ESPACENET Machine Translation of CN 104440758 A Which Originally Published on Mar. 25, 2015. (Year: 2015).*
ESPACENET Machine Translation of JP 2007-263584 A Which Originally Published on Oct. 11, 2007. (Year: 2007).*

* cited by examiner

FLUID LEAKAGE DETECTION SYSTEM AND FLUID PRESSURE SYSTEM

TECHNICAL FIELD

The present invention relates to a fluid leakage detection system and a fluid pressure system.

BACKGROUND ART

JP2016-45068A discloses a fluid leakage sensing unit including a rod seal that is brought into contact with a piston rod of a hydraulic cylinder and that seals working fluid in a fluid-side space on an outer circumference of the piston rod, a dust seal that is brought into contact with the outer circumference of the piston rod and that is arranged on the opposite side from the fluid-side space with respect to the rod seal in the axial direction of the piston rod, and an alert transmitting unit for transmitting an alert in response to a pressure increase between the rod seal and the dust seal when a leakage of the working fluid through the rod seal is caused.

SUMMARY OF INVENTION

With the fluid leakage sensing unit disclosed in JP2016-45068A, as the pressure in a space between the rod seal and the irregular-shaped dust seal (detection space) is increased to a predetermined value, the alert transmitting unit transmits the alert to sense the leakage of the fluid in a hydraulic chamber (the fluid-side space) of the hydraulic cylinder.

When the pressure in the hydraulic chamber of the hydraulic cylinder is relatively high, the pressure of the fluid leaking out through the rod seal increases correspondingly, and a degree of the pressure increase in the detection space is also increased. Therefore, with the above-described fluid leakage sensing unit, when the pressure in the hydraulic chamber is relatively high, it is easy to detect the leakage of the fluid.

However, when the pressure in the hydraulic chamber is relatively low, the degree of the pressure increase in the detection space becomes small. Thus, with the above-described fluid leakage sensing unit, if a state in which the hydraulic cylinder is driven by supplying relatively low-pressure working oil to the hydraulic chamber is continued, the pressure in the detection space is not increased to the predetermined value at which the alert is transmitted even if the rod seal wears out progressively, and so, it is not possible to detect the fluid leakage accurately.

It is an object of the present invention to improve a detection accuracy of liquid leakage by a fluid leakage detection system.

According to an aspect of the present invention, there is provided a fluid leakage detection system configured to detect leakage of working fluid in a fluid pressure cylinder having a piston rod extended from a cylinder tube and a cylinder head provided on the cylinder tube, the piston rod being inserted through the cylinder head, and the leakage of the working fluid being caused from a fluid pressure chamber in the cylinder tube through a gap between the piston rod and the cylinder head. The fluid leakage detection system includes: a detection unit provided in the fluid pressure cylinder, the detection unit being configured to detect pressure of the working fluid leaking out through the gap between the piston rod and the cylinder head; a controller configured to acquire detected result from the detection unit, wherein the detection unit has: a rod seal provided in the cylinder head, the rod seal being configured to seal the gap between the piston rod and the cylinder head; a detection space to which the working fluid leaked out through the rod seal is guided; and a detecting section configured to detect pressure in the detection space, the controller has: a calculation unit configured to calculate a pressure parameter representing a pressure fluctuation in the detection space due to pressure in the fluid pressure chamber, based on the detected result from the detecting section; and a determination unit configured to determine whether or not the leakage of the working fluid has been caused, based on the pressure parameter, and the pressure parameter includes an upper limit value and a lower limit value of the pressure fluctuation obtained from the detected result detected by the detecting section within a predetermined detection period.

DESCRIPTION OF EMBODIMENTS

A fluid leakage detection system 100 according to an embodiment of the present invention will be described below with reference to the drawings.

First, an overall configuration of a fluid pressure system 101 provided with the fluid leakage detection system 100 will be described with reference to FIG. 1.

The fluid pressure system 101 is used in a construction machinery, in particular a hydraulic excavator. The fluid pressure system 101 controls a flow of working oil (working fluid) supplied to and discharged from a hydraulic cylinder (fluid pressure cylinder) 1 serving as a cylinder device and drives the hydraulic cylinder 1.

Figure 1:
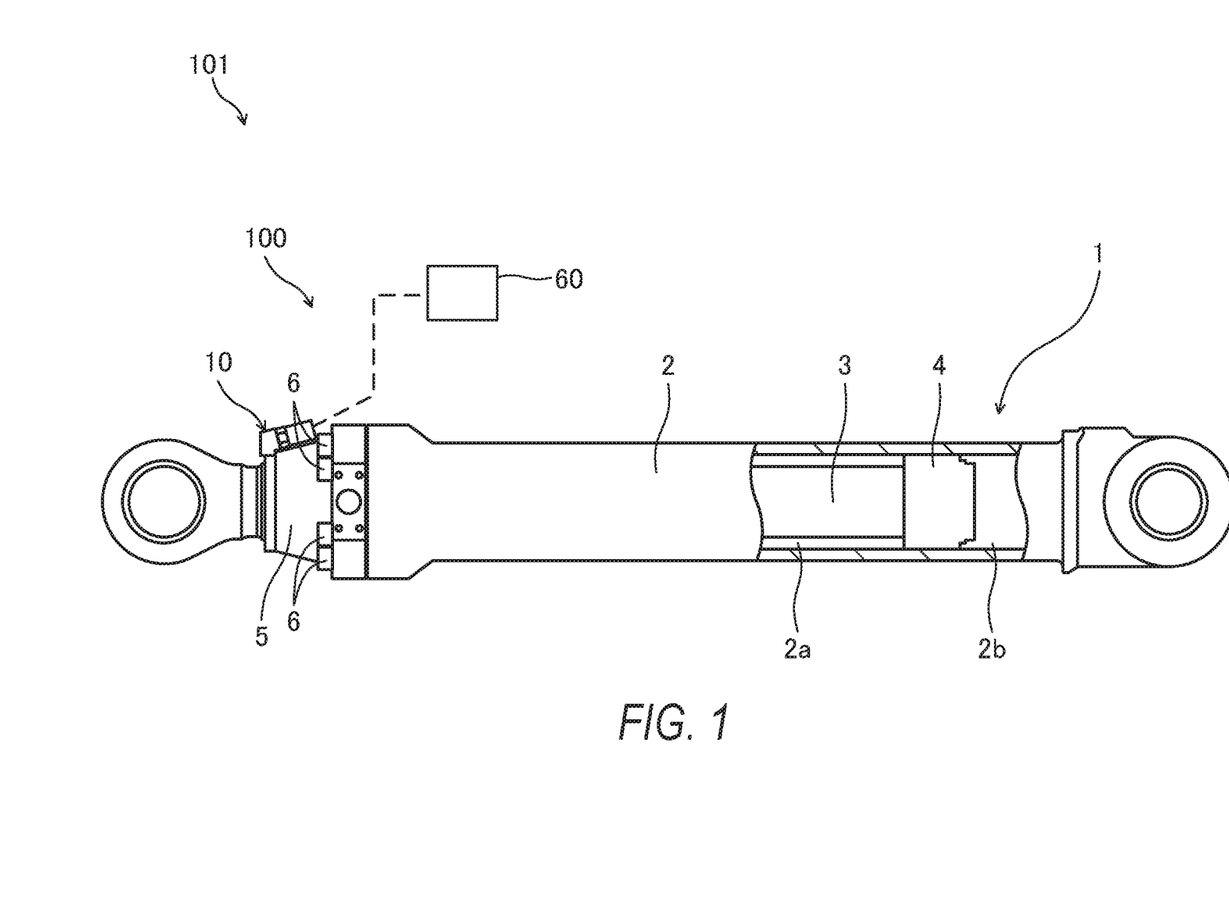
FIG. 1 is a partial cross-sectional view showing a hydraulic cylinder according to an embodiment of the present invention.

As shown in FIG. 1, the fluid pressure system 101 includes: the hydraulic cylinder 1 serving as the cylinder device for driving objects to be driven (not shown), such as a boom, an arm, and a bucket; a fluid pressure control device (not shown) for controlling operation of the hydraulic cylinder 1 by controlling supply/discharge of the working oil to/from the hydraulic cylinder 1; and the fluid leakage detection system 100 for detecting the oil leakage through a rod seal 11 (see FIG. 2) serving as a seal member provided in the hydraulic cylinder 1.

As shown in FIG. 1, the hydraulic cylinder 1 includes a cylindrical cylinder tube 2, a piston rod 3 that is inserted through the cylinder tube 2, and a piston 4 that is provided on the base end of the piston rod 3. The piston 4 is provided so as to be freely slidable along an inner circumferential surface of the cylinder tube 2. An interior of the cylinder tube 2 is partitioned by the piston 4 into a rod-side chamber (fluid pressure chamber) 2a and a counter-rod-side chamber 2b.

The piston rod 3 has a tip end extending from an open end of the cylinder tube 2. As the working oil is selectively guided from a hydraulic pressure source (not shown) to the rod-side chamber 2a or the counter-rod-side chamber 2b, the piston rod 3 is moved relative to the cylinder tube 2. As a result, the hydraulic cylinder 1 is extended/contracted.

A cylinder head 5 through which the piston rod 3 is inserted is provided on the open end of the cylinder tube 2. The cylinder head 5 is fastened to the open end of the cylinder tube 2 using a plurality of bolts 6.

The fluid leakage detection system 100 will be described below in detail with reference to FIGS. 2 and 3.

Figure 2:
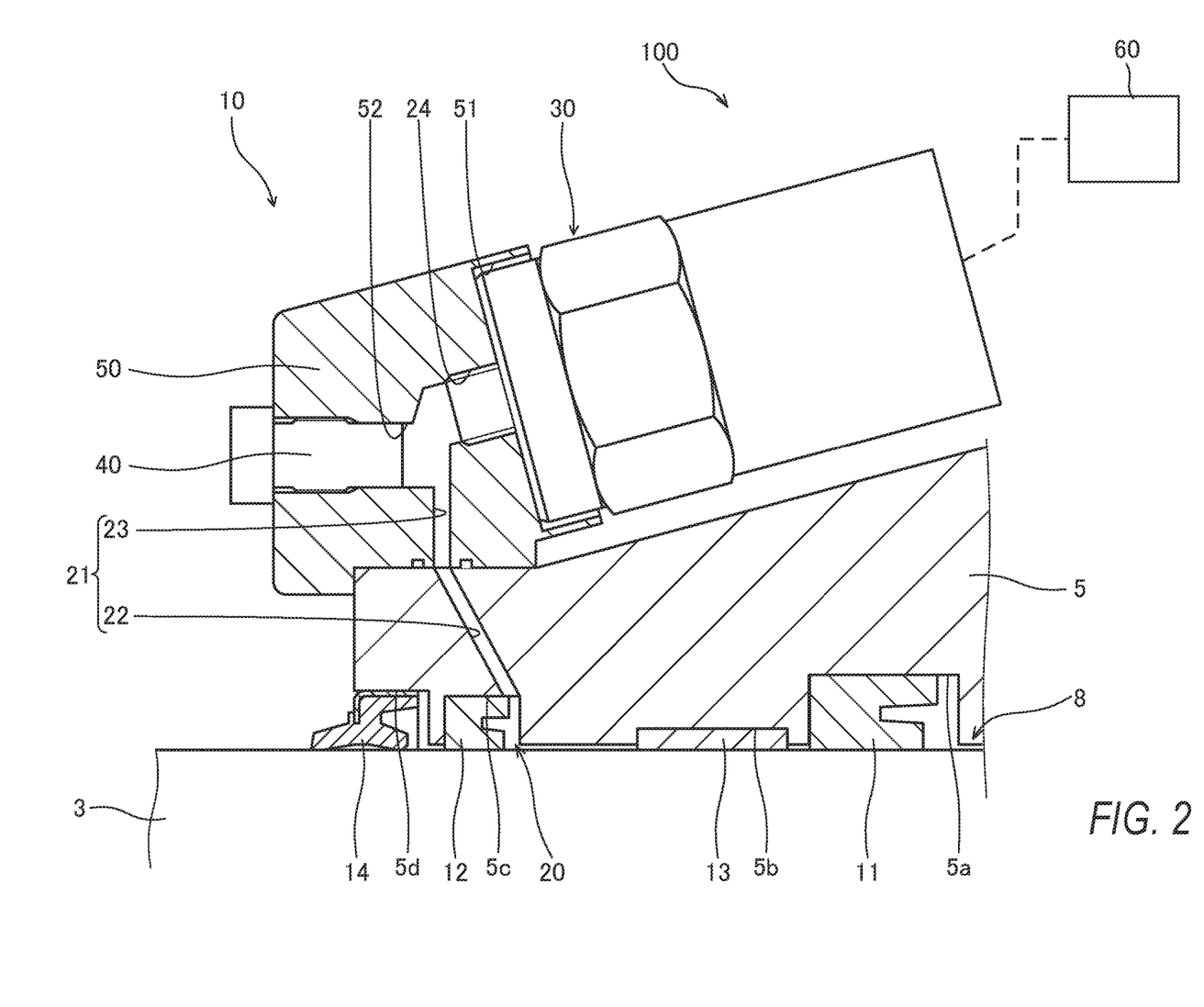
FIG. 2 is an enlarged cross-sectional view showing the fluid leakage detection system according to the embodiment of the present invention.
Figure 3:
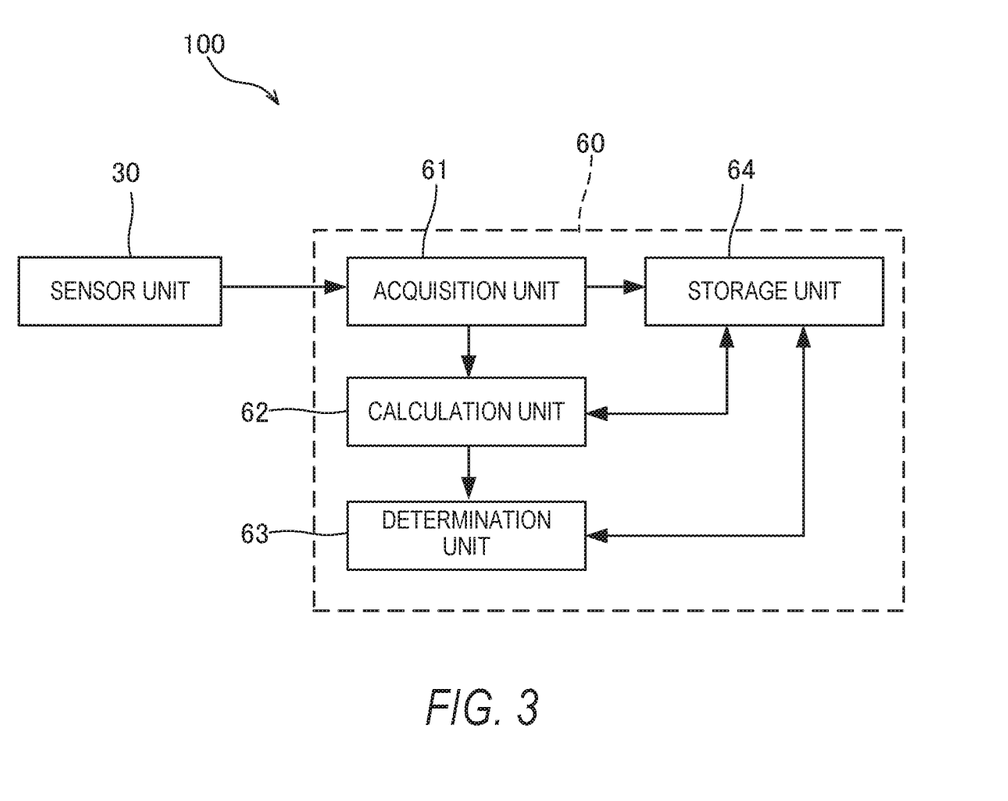
FIG. 3 is a block diagram showing a configuration of a controller of the fluid leakage detection system according to the embodiment of the present invention.

As shown in FIG. 2, the fluid leakage detection system 100 includes a detection unit 10 provided in the hydraulic cylinder 1 for detecting the pressure and the temperature of the working oil leaking out through an annular gap (hereinafter referred to as "an annular gap 8") between an outer circumferential surface of the piston rod 3 and the inner circumferential surface of the cylinder head 5, and a controller 60 for determining the occurrence of the oil leakage (fluid leakage) in the hydraulic cylinder 1 on the basis of a detected result from the detection unit 10.

The detection unit 10 includes: the rod seal 11 provided in the cylinder head 5 for sealing the annular gap (hereinafter referred to as "the annular gap 8") between the outer circumferential surface of the piston rod 3 and the inner circumferential surface of the cylinder head 5; a detection seal 12 provided in the cylinder head 5 for sealing the annular gap 8 and partitioning a detection space 20 together with the rod seal 11; a communication passage 21 that communicates with the detection space 20; a sensor unit 30 serving as a detecting section for detecting the pressure and the temperature of the working oil that has been guided through the communication passage 21; a relief valve 40 that is opened to release the pressure in the communication passage 21 when the pressure in the communication passage 21 reaches relief pressure $P_r$; and a housing 50 for accommodating the sensor unit 30 and the relief valve 40.

As shown in FIG. 2, in an inner circumference of the cylinder head 5, the rod seal 11, a bush 13, the detection seal 12, and a dust seal 14 are interposed in this order from the base end side (the right side in FIG. 2) to the tip end side (the left side in FIG. 2). The rod seal 11, the bush 13, the detection seal 12, and the dust seal 14 are received in annular grooves 5a, 5b, 5c, and 5d formed in the inner circumference of the cylinder head 5, respectively.

The bush 13 slides on the outer circumferential surface of the piston rod 3, thereby supporting the piston rod 3 so as to movable in the axial direction of the cylinder tube 2.

The rod seal 11 is compressed between an outer circumference of the piston rod 3 and the annular groove 5a of the inner circumference of the cylinder head 5, thereby sealing the annular gap 8. The rod seal 11 prevents leakage of the working oil in the rod-side chamber 2a (see FIG. 1) to the outside. The rod seal 11 is a so-called U-packing.

Although the bush 13 and the rod seal 11 are provided in the inner circumference of the cylinder head 5 in this order in the direction in which the hydraulic cylinder 1 contracts, they may be provided in the reverse order.

The dust seal 14 is provided in the cylinder head 5 so as to face the outside of the cylinder tube 2, and seals the annular gap 8. The dust seal 14 scrapes out dusts adhering to the outer circumferential surface of the piston rod 3, and prevents invasion of the dusts into the cylinder tube 2 from the outside.

Similarly to the rod seal 11, the detection seal 12 is compressed between the outer circumference of the piston rod 3 and the annular groove 5c of the inner circumference of the cylinder head 5, thereby sealing the annular gap 8. The detection seal 12 is provided between the rod seal 11 and the dust seal 14, and partitions the detection space 20 together with the rod seal 11. In other words, the detection space 20 is a space defined by the piston rod 3, the cylinder head 5, the rod seal 11, and the detection seal 12 (in the present embodiment, the bush 13 in addition thereto). Similarly to the rod seal 11, the detection seal 12 is a U-packing. The detection seal 12 may not be provided, and the dust seal 14 may be used as the detection seal. In this case, a detection space is provided between the dust seal 14 and the rod seal 11.

The communication passage 21 is formed from the cylinder head 5 to the housing 50 so as to communicate with the detection space 20. The communication passage 21 has a first communication passage 22 formed in the cylinder head 5 so as to open to the detection space 20 and a second communication passage 23 formed in the housing 50 so as to communicate with the first communication passage 22. The working oil that has leaked out from the rod-side chamber 2a through the rod seal 11 is guided to the communication passage 21 through the detection space 20.

The housing 50 is fixed to an end part of the cylinder head 5 by being press-fitted. The housing 50 is further formed with a sensor receiving hole 51 for receiving the sensor unit 30 and a valve receiving hole 52 for receiving the relief valve 40. The sensor receiving hole 51 and the valve receiving hole 52 respectively communicate with the second communication passage 23, and the valve receiving hole 52 communicates with the second communication passage 23 at the first communication passage 22 side (upstream side) of the sensor receiving hole 51.

The sensor unit 30 is attached to the housing 50 by being partially received in the sensor receiving hole 51 and detects the pressure and the temperature of the working oil guided from the detection space 20 through the first communication passage 22 and the second communication passage 23. The sensor unit 30 is fixed by being screwed into a threaded hole 24 that communicates with the second communication passage 23 of the housing 50.

The sensor unit 30 is a pressure/temperature sensor capable of detecting pressure and temperature. The sensor unit 30 detects the pressure and the temperature in the detection space 20 at a predetermined sampling cycle for a predetermined period of time (detection period) at predetermined time intervals (detection intervals). As described above, the sensor unit 30 detects the pressure and the temperature in the detection space 20 at predetermined detection intervals (intermittently) instead of detecting the pressure and the temperature constantly (continuously), and therefore, it is possible to reduce the power consumption. When the detection of the pressure and the temperature is finished, the sensor unit 30 wirelessly transmits the detected result to the controller 60. The detection intervals, the detection period, and the sampling cycle of the sensor unit 30 are appropriately set so as to be able to detect the oil leakage in accordance with the specifications, usage environment, and so forth of the hydraulic cylinder 1 and equipment and facility in which the hydraulic cylinder 1 is used.

As the pressure of the working oil in the rod-side chamber 2a is increased, the leakage of the oil to the detection space 20 tends to be caused more easily, and as the degree of deterioration of the sealing property of the rod seal 11 is increased, the working oil tends to leak out to the detection space 20 more easily. In addition, the pressure in the rod-side chamber 2a fluctuates in response to the operation of the hydraulic cylinder 1, and therefore, in a state in which the rod seal 11 is degraded and the working oil leaks out to the detection space 20, the pressure in the detection space 20 also fluctuates in response to the pressure in the rod-side chamber 2a. Therefore, by detecting the pressure in the detection space 20 using the sensor unit 30 and evaluating the pressure fluctuation in the detection space 20, it is possible to grasp the leakage (the degree of the leakage) of the working oil.

In the present embodiment, the sensor unit 30 is configured with a single pressure/temperature sensor, and the sensor unit 30 detects the pressure and the temperature of the working oil in the detection space 20; however, the configuration is not limited thereto, and the pressure and the temperature of the working oil may be detected by a pressure sensor and a temperature sensor, respectively. In other words, in the present embodiment, the sensor unit 30 may be configured with the pressure sensor and the temperature sensor.

The relief valve 40 is opened when the pressure of the working oil in the second communication passage 23 reaches a predetermined pressure (i.e. the relief pressure $P_r$), and the working oil in the detection space 20 is discharged through the second communication passage 23 to the outside. With such a configuration, the pressure in the detection space 20 is limited to the relief pressure $P_r$ by the relief valve 40. Because it is possible to employ a known structure for the structure of the relief valve 40, detailed illustration and description thereof are omitted.

The controller 60 is configured with a microcomputer including a CPU (central processing unit), a ROM (read only memory), a RAM (random access memory), and an I/O interface (input/output interface). The RAM stores data from processing executed by the CPU, the ROM pre-stores a control program, etc. for the CPU, and the I/O interface is used for input/output of information to/from a connected device. The controller 60 may be configured with a plurality of microcomputers. The controller 60 is programmed so as to be able to execute at least the processing necessary for the control according to the present embodiment and the modification. The controller 60 may be configured as a single device, or may be configured such that each control according to the present embodiment is executed by the plurality of devices in a distributed processing.

Data of the pressure and the temperature in the detection space 20 detected by the sensor unit 30 is transmitted to the controller 60 by wireless communication. As shown in FIG. 3, the controller 60 has: an acquisition unit 61 that acquires the pressure and temperature data detected by the sensor unit 30; a calculation unit 62 that calculates pressure parameters and a temperature parameter from the pressure and temperature data acquired by the acquisition unit 61, the pressure parameters representing the pressure fluctuation in the detection space 20 and the temperature parameter representing a temperature change in the detection space 20; a determination unit 63 that determines whether or not the leakage of the working oil has been caused on the basis of the pressure parameters and the temperature parameter calculated by the calculation unit 62; and a storage unit 64 that stores the pressure and temperature data acquired by the acquisition unit 61, the pressure parameters and the temperature parameter calculated by the calculation unit 62, the determination result of the determination unit 63, and so forth.

The calculation unit 62 calculates, from the pressure data acquired by the acquisition unit 61, the upper limit value $P_{max}$ of the pressure fluctuation within the detection period, the lower limit value $P_{min}$ of the pressure fluctuation, and the frequency (the number of times) $N_{over}$ at which the pressure fluctuation in the detection space 20 exceeds a predetermined threshold value (hereinafter referred to as "frequency threshold value $P_c$") as the pressure parameters for determining whether or not the oil leakage has been caused. In addition, the calculation unit 62 calculates the temperature integrated value $I_t$ in the detection space 20 from the temperature data acquired by the acquisition unit 61 and the past temperature data stored in the storage unit 64.

The determination unit 63 calculates the determination value V for determining whether or not the oil leakage has been caused on the basis of the upper limit value $P_{max}$ of the pressure fluctuation, the lower limit value $P_{min}$ of the pressure fluctuation, the frequency $N_{over}$, and the temperature integrated value $I_t$ calculated by the calculation unit 62 and on the basis of the relief pressure $P_r$ of the relief valve 40 stored in advance in the storage unit 64. If the determination value V is equal to or larger than the preset determination threshold value, the determination unit 63 determines that the oil leakage has been caused. If the determination value V is smaller than the determination threshold value, the determination unit 63 determines that the oil leakage has not been caused.

FIGS. 4 to 7 are graph diagrams schematically showing the pressure detected by the sensor unit 30 plotted with time on the horizontal axis and pressure on the vertical axis. In other words, FIGS. 4 to 7 are pressure waveforms showing the pressure fluctuation in the detection space 20. For example, referring to FIG. 4, the upper limit value $P_{max}$ and the lower limit value $P_{min}$ correspond to the maximum value (=P1) and the minimum value (=0) of the pressure in the detection space 20 detected within the detection period. The frequency $N_{over}$ is three times in the case shown in FIG. 6, and it corresponds to the number of peaks having values equal to or higher than the threshold value in the pressure waveform.

The temperature integrated value $I_t$ is not an integrated value of the temperature data acquired by a single detection, but is an integrated value obtained by integrating the temperature data from previous detection history stored in the storage unit 64. Specifically, in the present embodiment, the temperature integrated value $I_t$ is obtained by integrating all the temperature data from the first detection performed by the sensor unit 30. In other words, the temperature integrated value $I_t$ represents the total amount of heat applied to the detection space 20 before the determination unit 63 computes the determination value V.

Determination of occurrence the oil leakage performed by the fluid leakage detection system 100 will be specifically described below.

The rod seal 11 is degraded due to the expansion/contraction operation of the hydraulic cylinder 1, an impact applied from the outside, and so forth, and thereby, the sealing property is deteriorated. As the sealing property is deteriorated, the amount of the working oil leaking from the rod-side chamber 2a through the annular gap 8 between the outer circumference of the piston rod 3 and the inner circumference of the cylinder head 5 is increased. If the leaking amount of the working oil is increased, there is a risk in that the hydraulic cylinder 1 cannot exhibit a desired performance of the hydraulic cylinder 1. Therefore, in the hydraulic cylinder 1, the leakage of the working oil is detected by the fluid leakage detection system 100 in order to grasp the degradation of the rod seal 11 and the deterioration of the performance of the hydraulic cylinder 1 caused by the leakage of the working oil. In the present specification, the term "degradation" of the rod seal 11 includes wear and damage. The wear is caused by a steady load such as reciprocating movement of the piston rod 3, and refers to the degradation related to the lifetime. The damage refers to degradation due to an incidental load applied by an accident, etc.

Here, the term "the oil leakage has not been caused" in the present specification does not mean a strict meaning, and does not solely mean a state in which the working oil has not been leaked at all into the detection space 20 beyond the rod seal 11. For example, even in a case in which the working oil has leaked from the rod-side chamber 2a into the detection space 20, if the degree of the degradation (wear/damage) of the rod seal 11 is acceptable, the determination unit 63 determines that "the oil leakage has not been caused". In other words, the term "the oil leakage has been caused" refers to a state in which the degradation (wear/damage) of the rod seal 11 has exceeded an allowable range. Thus, the determination threshold value is set according to the degree of the degradation (wear/damage) of the rod seal 11 that is allowable. A plurality of determination threshold values may be set to evaluate the degrees of the oil leakage.

In the fluid leakage detection system 100, the pressure in the detection space 20 is detected by the sensor unit 30 of the detection unit 10, and the controller 60 determines whether or not the oil leakage has been caused on the basis of the detected result, thereby detecting the oil leakage in the hydraulic cylinder 1. Specifically, in the fluid leakage detection system 100 according to the present embodiment, the sensor unit 30 detects the pressure and the temperature in the detection space 20 for a predetermined detection period at predetermined time intervals. The detection result from the sensor unit 30 is transmitted to the acquisition unit 61 of the controller 60. When the acquiring unit 61 acquires the detection result from the sensor unit 30, the calculating unit 62 of the controller 60 calculates the pressure parameters (the upper limit value $P_{max}$, the lower limit value and the frequency $N_{over}$) representing the pressure fluctuation in the detection space 20 and the temperature parameter (the temperature integrated value $I_t$) on the basis of the detected result. The determination unit 63 calculates the determination value V on the basis of the pressure parameters and the temperature parameter calculated by the calculation unit 62 and determines whether or not the leakage of the working oil has been caused.

As described above, when the upper limit value is indicated as $P_{max}$ and the lower limit value is indicated as $P_{min}$ for the pressure fluctuation in the detection space 20 within the detection period, the frequency at which the pressure in the detection space 20 exceeds the threshold value is indicated as $N_{over}$, the integrated temperature value obtained by integrating the temperature data is indicated as $I_t$, and the relief pressure of the relief valve 40 is indicated as Pr, the determination value V can be calculated in accordance with determination formula expressed by the following formula (1).

Formula (1)

$$V = \frac{(C_1 \times P_{max}) \times (C_3 \times N_{over}) \times (C_4 \times I_t)}{C_2 \times (P_r - P_{min})} \quad (1)$$

In the formula (1), C1, C2, C3, and C4 are weighting coefficients for weighting the influences on the determination value V of the upper limit value $P_{max}$, the lower limit value $P_{min}$, and the frequency $N_{over}$ for the pressure fluctuation, and the temperature integrated value $I_t$, respectively. The weighting coefficients are set in accordance with the specifications, the usage environment, and so forth of the hydraulic cylinder 1 and the equipment and the facility in which the hydraulic cylinder 1 is used.

In the determination formula, the numerator is represented by the product of the upper limit value $P_{max}$, and the frequency $N_{over}$ for the pressure fluctuation, and the temperature integrated value $I_t$. In addition, in the determination formula, the denominator is represented by a difference obtained by subtracting the lower limit value $P_{min}$ of the pressure fluctuation from the relief pressure $P_r$ of the relief valve 40. In a state in which the degree of the degradation of the rod seal 11 is high and the oil leakage tends to be caused, each of the upper limit value $P_{max}$, the lower limit value $P_{min}$, and the frequency $N_{over}$ for the pressure fluctuation becomes a large value. Therefore, as the degradation of the rod seal 11 is progressed, the upper limit value $P_{max}$ and the value of the frequency $N_{over}$ for the pressure fluctuation are increased, and the determination value V is also increased. In addition, as the degradation of the rod seal 11 is progressed, the lower limit value $P_{min}$ of the pressure fluctuation constituting the denominator is increased. Thus, the total value of the denominator in the determination formula becomes smaller, and the determination value V itself becomes larger. As is clear from the formula (1), the maximum value of the denominator corresponds to the relief pressure $P_r$, when the lower limit value $P_{min}$ of the pressure fluctuation is equal to zero.

Figure 4:
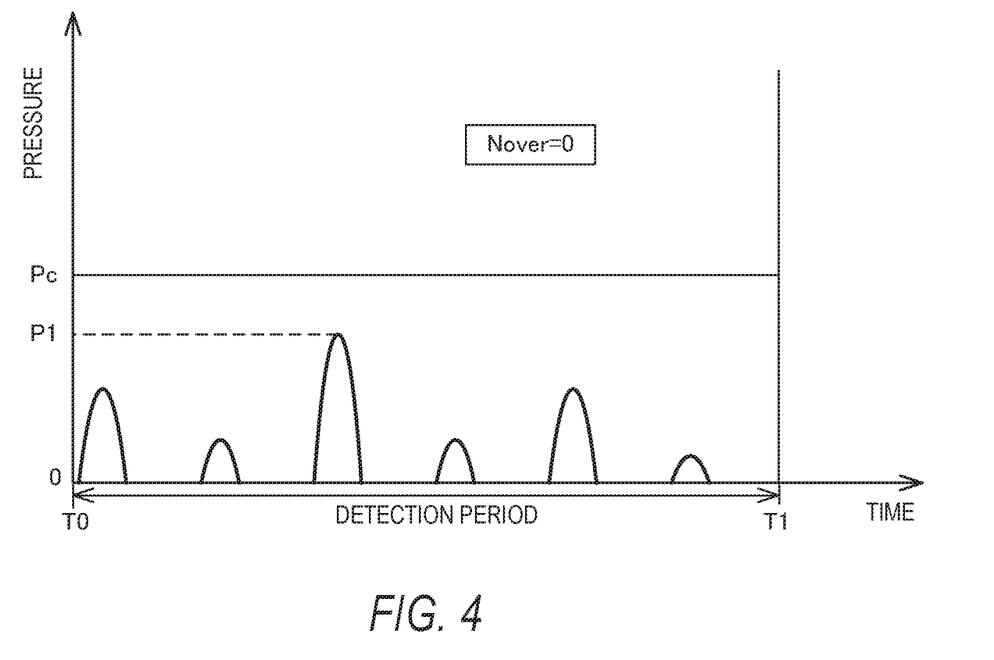
FIG. 4 is a schematic diagram showing an example of a pressure waveform detected by a detection unit of the fluid leakage detection system according to the embodiment of the present invention, and is a diagram showing an example in which oil leakage has not been caused.
Figure 5:
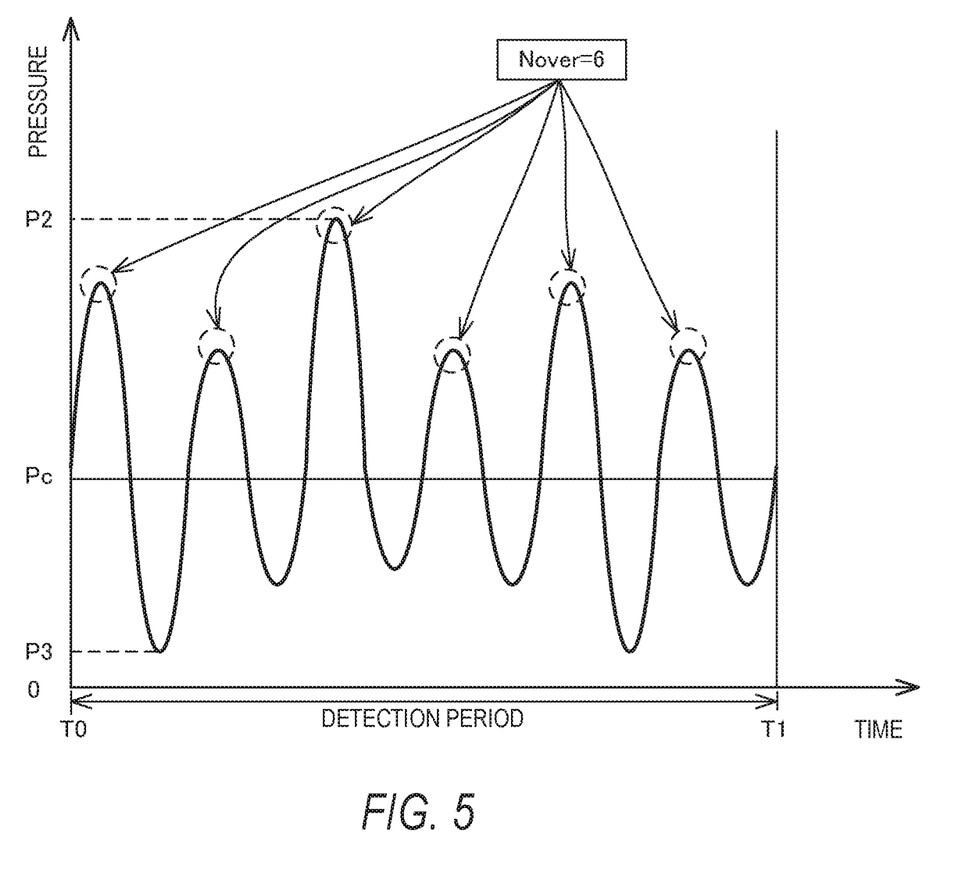
FIG. 5 is a schematic diagram showing an example of the pressure waveform detected by the detection unit of the fluid leakage detection system according to the embodiment of the present invention, and is a diagram showing an example in which the oil leakage has been caused.
Figure 6:
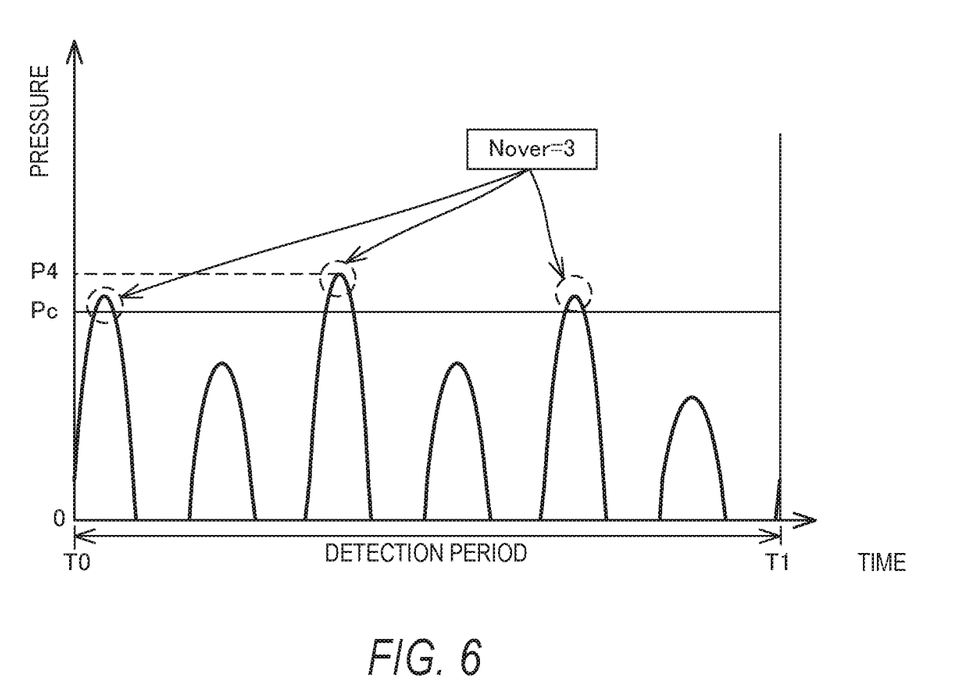
FIG. 6 is a schematic diagram showing an example of the pressure waveform detected by the detection unit of the fluid leakage detection system according to the embodiment of the present invention, and is a diagram showing an example in which the pressure in a rod-side chamber is low and the oil leakage has not been caused.
Figure 7:
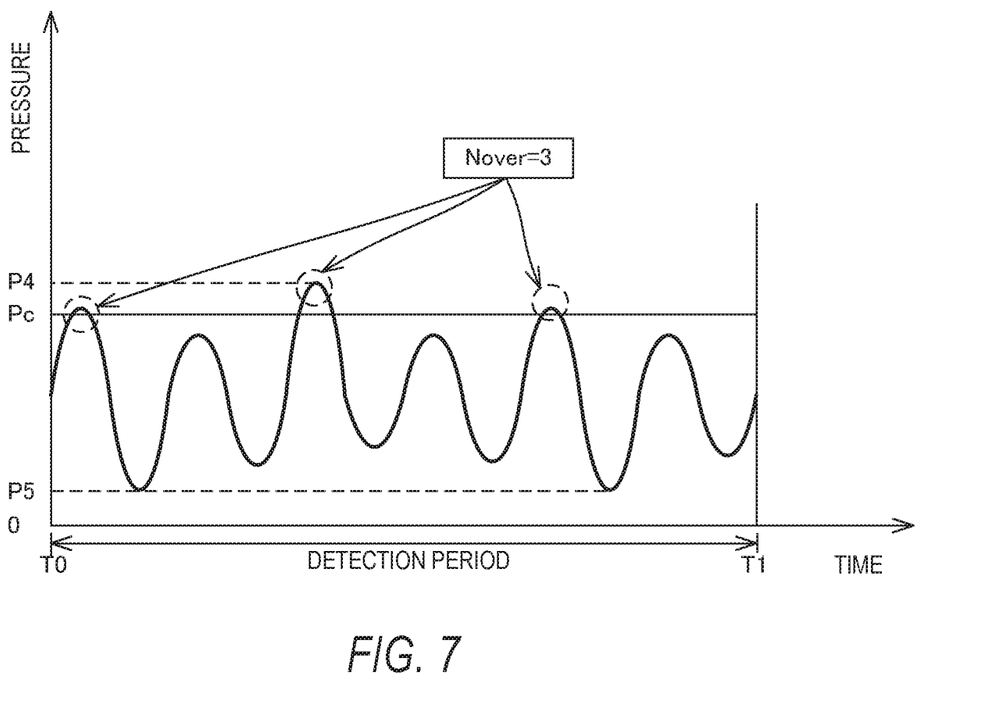
FIG. 7 is a schematic diagram showing an example of the pressure waveform detected by the detection unit of the fluid leakage detection system according to the embodiment of the present invention, and is a diagram showing an example in which the pressure in the rod-side chamber is low and the oil leakage has been caused.

The detection of the oil leakage performed by the fluid leakage detection system 100 will be described specifically below with reference to the specific examples shown in FIGS. 4 to 7. The example shown in FIG. 4 shows the pressure waveform showing a state in which the degree of the degradation of the rod seal 11 is small and the oil leakage has not been caused. The example shown in FIG. 5 is an example showing a state in which the degradation of the rod seal 11 has been progressed as compared with the example shown in FIG. 4 and the oil leakage has been caused. The examples shown in FIGS. 6 and 7 respectively show cases in which the pressure in the rod-side chamber 2a is low and the amplitude of the pressure fluctuation is small (the case in which low pressure is maintained). The example shown in FIG. 6 shows a state in which the degradation has not been progressed and the oil leakage has not been caused, and the example shown in FIG. 7 shows a state in which the degradation has been progressed and the oil leakage has been caused even in a state in which the pressure in the rod-side chamber 2a is low.

In the example shown in FIG. 4, the upper limit value $P_{max}$ of the pressure fluctuation is P1 having a relatively small value, and the frequency $N_{over}$ at which the pressure exceeds the threshold value within the detection period is zero. In addition, the lower limit value $P_{min}$ of the pressure fluctuation is zero. Thus, in the example shown in FIG. 4, the determination value V becomes zero and becomes equal to or less than the determination threshold value.

As the degradation of the rod seal 11 is progressed, the pressure in the rod-side chamber 2a tends to be guided into the detection space 20, and therefore, as shown in FIG. 5, the upper limit value $P_{max}$ and the frequency $N_{over}$ for the pressure fluctuation in the detection space 20 are increased. In the example shown in FIG. 5, the upper limit value $P_{max}$ is P2 having a value larger than that of P1 in FIG. 4, and the frequency $N_{over}$ is six.

In addition, as the degradation of the rod seal 11 is progressed, the working oil begins to leak out from the rod-side chamber 2a into the detection space 20 even at lower pressure. More specifically, the working oil begins to leak out beyond the rod seal 11 into the detection space 20 even at the lowest pressure of the rod-side chamber 2a (even at the lower limit value of the pressure fluctuation in the rod-side chamber 2a) within the detection period. Thus, as shown in FIG. 5, the lower limit value $P_{min}$ of the pressure fluctuation in the detection space 20 becomes a value P3 having a value larger than zero. As described above, as the degradation of the rod seal 11 is progressed and the degree of the leakage of the working oil is increased, the upper limit value $P_{max}$, the frequency $N_{over}$, and the lower limit value $P_{min}$ for the pressure fluctuation are increased, and the determination value V is also increased correspondingly. Therefore, in the example shown in FIG. 5, the determination value V exceeds the determination threshold value, and the determination unit 63 determines that the oil leakage has been caused.

In a case in which the pressure in the rod-side chamber 2a is relatively low and the amplitude of the pressure fluctuation in the rod-side chamber 2a is also small, as shown in FIG. 6, the upper limit value $P_{max}$ and the frequency $N_{over}$ for the pressure fluctuation in the detection space 20 have relatively small values.

In such cases, as shown in FIG. 7, even if the degradation of the rod seal 11 is progressed, the upper limit value $P_{max}$ and the frequency $N_{over}$ for the pressure fluctuation in the detection space 20 are not increased. Thus, the value of the numerator of the determination formula becomes smaller, and it is not possible to detect the oil leakage by using only the upper limit value $P_{max}$ and the frequency $N_{over}$ for the pressure fluctuation in the detection space 20.

On the other hand, as shown in FIG. 7, as the degradation of the rod seal 11 is progressed, the lower limit value $P_{min}$ of the pressure fluctuation is increased even if the pressure in the rod-side chamber 2a is low (P5 in FIG. 7). Thus, in the present embodiment, the determination formula includes, as the parameter for obtaining the determination value V, the lower limit value $P_{min}$ of the pressure fluctuation in the detection space 20. Therefore, even in a case in which the pressure in the rod-side chamber 2a is low, the amplitude of the pressure fluctuation is small, and the upper limit value $P_{max}$ and the frequency $N_{over}$ for the pressure fluctuation in the detection space 20 are small, if the value of the lower limit value $P_{min}$ is large, the determination value V also becomes large. Thus, in the present embodiment, even in a case in which the pressure in the rod-side chamber 2a is low, the amplitude of the pressure fluctuation is small, and the pressure in the detection space 20 does not become high as shown in FIG. 7, it is possible to determine that the oil leakage has been caused, and the detection accuracy of the oil leakage is improved.

In addition, as shown in the formula (1), the determination formula includes the denominator that is obtained by subtracting the lower limit value $P_{min}$ of the pressure fluctuation from the relief pressure $P_r$. Therefore, as the lower limit value $P_{min}$ of the pressure fluctuation is increased and approaches to the relief pressure $P_r$, the determination value V is increased rapidly. In other words, as the lower limit value $P_{min}$ approaches the relief pressure $P_r$, an mount of increase of the determination value V due to the increase in the lower limit value $P_{min}$ (a rate of increase in the determination value V relative to the increase in the lower limit value $P_{min}$) is increased. When the lower limit value $P_{min}$ run becomes the same value as the relief pressure $P_r$, the determination value V diverges. As described above, the determination formula is formulated such that the influence of the lower limit value $P_{min}$ is increased by including the difference between the relief pressure $P_r$ and the lower limit value $P_{min}$ as the denominator. Therefore, by using the determination formula such as the formula (1), it is possible to further improve the detection accuracy of the oil leakage in a case in which the pressure in the rod-side chamber 2a is relatively low.

The temperature integrated value $I_t$ is obtained by integrating not only the temperature data within the detection period but also all the temperature data stored in the storage unit 64. Thus, for example, even if the temperature in the detection space 20 is relatively low, the temperature integrated value $I_t$ becomes larger for the hydraulic cylinder 1 that has been used for a longer period of time. By incorporating such a temperature integrated value $I_t$ into the determination formula, it is possible to reflect the factors such as the thermal effect for the rod seal 11 and the lifetime of the rod seal 11 onto the determination value V, and so, it is possible to detect the oil leakage with a high accuracy.

In a case in which it is determined that the oil leakage has been caused by using the above-described the determination method, an operator is notified that a replacement timing of the rod seal 11 has been reached by a warning lamp (not shown), etc., for example.

As described above, with the hydraulic cylinder 1, it is possible to sense the degree of the degradation of the rod seal 11 on the basis of the pressure detected by the sensor unit 30 of the fluid leakage detection system 100. Therefore, it is possible to manage the replacement timing of the rod seal 11 with ease.

Next, a modification of the present embodiment will be described. The following modifications are also within the scope of the present invention, and it is also possible to combine the configurations shown in the modification with the configurations described in the above embodiment, or to combine the configurations described in the following different modifications.

In the above-mentioned embodiment, the case in which the cylinder device is the hydraulic cylinder 1 has been described. The present invention is not limited to such a case, and the fluid leakage detection system 100 may be employed as the cylinder device in a shock absorber, etc. In addition, in the case in which the cylinder device is the hydraulic cylinder 1, the hydraulic cylinder 1 may be of a double rod type, or may be of a single action type in which the working oil is supplied/discharged only to/from the rod-side chamber 2a. In addition, the working fluid is not limited to the working oil, and, for example, water or other liquids may also be used.

In addition, in the above-mentioned embodiment, the pressure parameters include the upper limit value $P_{max}$, the lower limit value $P_{min}$, and the frequency $N_{over}$ for the pressure fluctuation. In contrast, the pressure parameters are not limited thereto, and other values representing the pressure fluctuation may be used. In addition, the frequency $N_{over}$ is not necessarily used. The pressure parameters used for the determination by the determination unit 63 may include at least the upper limit value $P_{max}$ and the lower limit value $P_{min}$ of the pressure fluctuation. In addition, the temperature parameter is not limited to the temperature integrated value $I_t$. Furthermore, the determination unit 63 may determine whether or not the oil leakage has been caused without using the temperature parameter, and in this case, the sensor unit may be one that is capable of detecting the pressure.

In addition, in the above-mentioned embodiment, the determination value V is calculated by the determination formula expressed by the formula (1), and thereby, it is determined whether or not the oil leakage has been caused. In contrast, the determination formula is not limited to the formula (1). For example, the determination formula may be one that simply calculates the determination value V by the product of the upper limit value $P_{max}$, the lower limit value $P_{min}$, and the frequency $N_{over}$ for the pressure fluctuation, and the temperature integrated value $I_t$.

In addition, in the above-mentioned embodiment, it is determined whether or not the oil leakage has been caused by calculating a single determination value V on the basis of the four parameters and by comparing the determination value V and the determination threshold value. In contrast, the determination method utilized by the determination unit 63 is not limited thereto as long as the method employs the upper limit value $P_{max}$ and the lower limit value $P_{min}$ of the pressure fluctuation. For example, in the determination method, the threshold values may respectively be set for the upper limit value $P_{max}$ and the lower limit value $P_{min}$ of the pressure fluctuation, and it may be possible to determine that the oil leakage has been caused if either one of the upper limit value $P_{max}$ and the lower limit value $P_{min}$ exceeds the corresponding threshold value.

According to the embodiment mentioned above, the advantages described below are afforded.

According to the fluid leakage detection system 100, the determination unit 63 of the controller 60 determines whether or not the oil leakage has been caused on the basis of the upper limit value $P_{max}$ and the lower limit value $P_{min}$ of the pressure fluctuation as the pressure parameters representing the pressure fluctuation in the detection space 20. As a result, even in a case in which the pressure in the rod-side chamber 2a is low and the determination cannot be performed by using the upper limit value $P_{max}$ of the pressure fluctuation in the detection space 20, it is possible to determine whether or not the oil leakage has been caused. Therefore, the detection accuracy for the oil leakage is improved.

In addition, the determination unit 63 determines whether or not the oil leakage has been caused on the basis of the frequency $N_{over}$ as the pressure parameter, in addition to the upper limit value $P_{max}$ and the lower limit value $P_{min}$. As a result, it is possible to detect the oil leakage with a higher accuracy.

In addition, the determination unit 63 determines whether or not the oil leakage has been caused on the basis of the temperature integrated value $I_t$ as the temperature parameter, in addition to the pressure parameters. As a result, it is possible to perform the oil leakage determination in consideration of the influence of the thermal effect and the lifetime, and thereby, the detection accuracy of the oil leakage is improved.

In addition, the determination unit 63 determines whether or not the leakage of the fluid has been caused by calculating a single determination value V by using the determination formula expressed by the formula (1) on the basis of the upper limit value $P_{max}$, the lower limit value $P_{min}$, and the frequency $N_{over}$ at which the pressure exceeds the threshold value for the pressure fluctuation, and the temperature integrated value $I_t$. In the determination formula, the difference between the relief pressure $P_r$ and the lower limit value $P_{min}$ for the pressure fluctuation constitutes the denominator. As described above, the determination formula is formulated such that the determination value V is exponentially increased with respect to the increase in the lower limit value $P_{min}$ and thereby, the influence of the lower limit value $P_{min}$ on the determination value V is increased. Therefore, by using the determination formula such as the formula (1), it is possible to detect the oil leakage with an especially high accuracy in a case in which the pressure in the rod-side chamber 2a is relatively low.

Configurations, functions, and effects of the embodiments of the present invention will be collectively described below.

The fluid leakage detection system 100 is configured to detect the leakage of the working oil in the hydraulic cylinder 1 having the piston rod 3 extended from the cylinder tube 2 and the cylinder head 5 provided on the cylinder tube 2, the piston rod 3 being inserted through the cylinder head 5, and the leakage of the working oil being caused from the rod-side chamber 2a in the cylinder tube 2 through the annular gap 8 between the piston rod 3 and the cylinder head 5. The fluid leakage detection system 100 includes: the detection unit 10 provided in the hydraulic cylinder 1, the detection unit 10 being configured to detect the pressure of the working oil leaking out through the annular gap 8 between the piston rod 3 and the cylinder head 5; and the controller 60 configured to acquire the detected result from the detection unit 10, wherein the detection unit 10 has: the rod seal 11 provided in the cylinder head 5, the rod seal 11 being configured to seal the gap between the piston rod 3 and the cylinder head 5; the detection space 20 to which the working oil leaked out through the rod seal 11 is guided; and the sensor unit 30 configured to detect the pressure in the detection space 20, the controller 60 has: the calculation unit 62 configured to calculate the pressure parameter representing the pressure fluctuation in the detection space 20 due to the pressure in the rod-side chamber 2a, based on the detected result from the sensor unit 30; and the determination unit 63 configured to determine whether or not the leakage of the working oil has been caused, based on the pressure parameter, and the pressure parameter includes the upper limit value $P_{max}$ and the lower limit value $P_{min}$ of the pressure fluctuation obtained from the detected result detected by the sensor unit 30 within a predetermined detection period.

In addition, in the fluid leakage detection system 100, the determination unit 63 calculates the determination value V based on the pressure parameter and determines that the leakage of the working fluid has been caused if the determination value V is equal to or larger than a predetermined determination threshold value, and the determination value V becomes larger as the upper limit value $P_{max}$ and the lower limit value $P_{min}$ of the pressure fluctuation are increased.

With the configurations described above, the determination unit 63 determines whether or not the oil leakage has been caused, based on the lower limit value $P_{min}$ in addition to the upper limit value $P_{max}$ of the pressure fluctuation in the detection space 20. By using the lower limit value $P_{min}$ of the pressure fluctuation in the detection space 20 in the oil leakage determination, even in a case in which the pressure in the rod-side chamber 2a is low and the oil leakage determination cannot be performed by using the upper limit value $P_{max}$ of the pressure fluctuation in the detection space 20, it is possible to determine whether or not the oil leakage has been caused. Therefore, the detection accuracy of the fluid leakage detection system 100 is improved.

In addition, in the fluid leakage detection system 100, the pressure parameter further includes the frequency $N_{over}$ at which the pressure in the detection space 20 exceeds a predetermined frequency threshold value $P_c$ within the detection period.

In addition, with the fluid leakage detection system 100, the determination unit 63 calculates the determination value V based on the pressure parameter and determines that the leakage of the working oil has been caused if the determination value V is equal to or larger than a predetermined determination threshold value, and the determination value V becomes larger as the frequency $N_{over}$ is increased.

With the configurations described above, it is possible to further improve the detection accuracy of the fluid leakage detection system 100.

In addition, in the fluid leakage detection system 100, the determination unit 63 determines whether or not the leakage of the working oil has been caused, based on the pressure parameter; and the temperature integrated value $I_t$ in the detection space 20 detected by the sensor unit 30 within the detection period.

In addition, in the fluid leakage detection system 100, the determination unit 63 calculates the determination value V based on the pressure parameter and the integrated value $I_t$ of the temperature and determines that the leakage of the working oil has been caused if the determination value V is equal to or larger than a predetermined determination threshold value, and the determination value V becomes larger as the integrated value $I_t$ of the temperature is increased.

With the configurations described above, it is possible to perform the oil leakage determination in consideration of the thermal effect and the lifetime for the rod seal 11, and thereby, it is possible to further improve the detection accuracy of the fluid leakage detection system 100.

In addition, the fluid leakage detection system 100 further includes the relief valve 40 configured to release the pressure in the detection space 20 by being opened when the pressure in the detection space 20 reaches the relief pressure $P_r$, wherein the determination unit 63 determines whether or not the leakage of the working oil has been caused, based on a difference between the relief pressure $P_r$ and the lower limit value $P_{min}$ of the pressure parameter.

In addition, the hydraulic cylinder 1 includes: the piston rod 3 extended from the cylinder tube 2; the cylinder head 5 provided on the cylinder tube 2, the piston rod 3 being inserted through the cylinder head 5; and the fluid leakage detection system 100 configured to detect the leakage of the working oil from the rod-side chamber 2a in the cylinder tube 2 through between the piston rod 3 and the cylinder head 5.

The embodiments of the present invention described above are merely illustration of some application examples of the present invention and the technical scope of the present invention is not limited to the specific constructions of the above embodiments.

This application is based on and claims priority to Japanese Patent Application No. 2018-088381 filed in Japan Patent Office on May 1, 2018, the entire content of which is incorporated herein by reference.

The invention claimed is:

1. A fluid leakage detection system configured to detect leakage of working fluid in a cylinder device having a piston rod that extends from a cylinder tube and a cylinder head that is provided on the cylinder tube, the piston rod being inserted in the cylinder head so as to have a gap through which the leakage of the working fluid from a fluid pressure chamber in the cylinder tube occurs, the fluid leakage detection system comprising:
   a detection unit provided in the cylinder device, the detection unit being configured to detect a pressure of the working fluid leaking out through the gap between the piston rod and the cylinder head; and
   a controller configured to acquire a detected result from the detection unit, wherein the detection unit has:
      a rod seal provided in the cylinder head, the rod seal being configured to seal the gap between the piston rod and the cylinder head;
      a detection space to which the working fluid leaking out through the rod seal is guided; and
      a detecting section configured to detect pressure in the detection space as the detected result,
   the controller has:
      a calculation unit configured to calculate a pressure parameter representing a pressure fluctuation in the detection space due to pressure in the fluid pressure chamber, based on the detected result from the detecting section; and
      a determination unit configured to determine whether or not the leakage of the working fluid has occurred, based on the pressure parameter,
   the pressure parameter includes an upper limit value and a lower limit value of the pressure fluctuation obtained from the detected result detected by the detecting section within a detection period, and
   the determination unit calculates a determination value based on the pressure parameter and determines that the leakage of the working fluid has occurred if the determination value is equal to or larger than a determination threshold value.

2. The fluid leakage detection system according to claim 1, wherein
   the detecting section further detects a temperature in the detection space, and
   the determination unit determines whether or not the leakage of the working fluid has occurred, based on the pressure parameter and an integrated value of the temperature in the detection space within the detection period.

3. A fluid pressure system comprising:
   the fluid leakage detection system according to claim 1; and
   the cylinder device including the piston rod and the cylinder head.

4. A fluid leakage detection system configured to detect leakage of working fluid in a cylinder device having a piston rod that extends from a cylinder tube and a cylinder head that is provided on the cylinder tube, the piston rod being inserted in the cylinder head so as to have a gap through which the leakage of the working fluid from a fluid pressure chamber in the cylinder tube occurs, the fluid leakage detection system comprising:
   a detection unit provided in the cylinder device, the detection unit being configured to detect a pressure of the working fluid leaking out through the gap between the piston rod and the cylinder head; and a controller configured to acquire a detected result from the detection unit, wherein the detection unit has:
  a rod seal provided in the cylinder head, the rod seal being configured to seal the gap between the piston rod and the cylinder head;
  a detection space to which the working fluid leaking out through the rod seal is guided; and
  a detecting section configured to detect pressure in the detection space as the detected result,
the controller has:
  a calculation unit configured to calculate a pressure parameter representing a pressure fluctuation in the detection space due to pressure in the fluid pressure chamber, based on the detected result from the detecting section; and
  a determination unit configured to determine whether or not the leakage of the working fluid has occurred, based on the pressure parameter,
the pressure parameter includes an upper limit value and a lower limit value of the pressure fluctuation obtained from the detected result detected by the detecting section within a detection period,
the determination unit calculates a determination value based on the pressure parameter and determines that the leakage of the working fluid has occurred if the determination value is equal to or larger than a determination threshold value, and
the determination value is calculated such that the determination value becomes larger as the upper limit value and the lower limit value of the pressure fluctuation are increased.

5. A fluid leakage detection system configured to detect leakage of working fluid in a cylinder device having a piston rod that extends from a cylinder tube and a cylinder head that is provided on the cylinder tube, the piston rod being inserted in the cylinder head so as to have a gap through which the leakage of the working fluid from a fluid pressure chamber in the cylinder tube occurs, the fluid leakage detection system comprising:
  a detection unit provided in the cylinder device, the detection unit being configured to detect a pressure of the working fluid leaking out through the gap between the piston rod and the cylinder head; and
  a controller configured to acquire a detected result from the detection unit, wherein the detection unit has:
    a rod seal provided in the cylinder head, the rod seal being configured to seal the gap between the piston rod and the cylinder head;
    a detection space to which the working fluid leaking out through the rod seal is guided; and
    a detecting section configured to detect pressure in the detection space as the detected result,
  the controller has:
    a calculation unit configured to calculate a pressure parameter representing a pressure fluctuation in the detection space due to pressure in the fluid pressure chamber, based on the detected result from the detecting section; and
    a determination unit configured to determine whether or not the leakage of the working fluid has occurred, based on the pressure parameter,
  the pressure parameter includes an upper limit value and a lower limit value of the pressure fluctuation obtained from the detected result detected by the detecting section within a detection period, and
  the pressure parameter further includes a frequency at which the pressure in the detection space exceeds a threshold value within the detection period.

6. The fluid leakage detection system according to claim 5, wherein
  the determination unit calculates the determination value based on the pressure parameter and determines that the leakage of the working fluid has occurred if the determination value is equal to or larger than a predetermined determination threshold value, and
  the determination value is calculated such that the determination value becomes larger as the frequency is increased.

7. A fluid leakage detection system configured to detect leakage of working fluid in a cylinder device having a piston rod that extends from a cylinder tube and a cylinder head that is provided on the cylinder tube, the piston rod being inserted in the cylinder head so as to have a gap through which the leakage of the working fluid from a fluid pressure chamber in the cylinder tube occurs, the fluid leakage detection system comprising:
  a detection unit provided in the cylinder device, the detection unit being configured to detect a pressure of the working fluid leaking out through the gap between the piston rod and the cylinder head; and
  a controller configured to acquire a detected result from the detection unit, wherein the detection unit has:
    a rod seal provided in the cylinder head, the rod seal being configured to seal the gap between the piston rod and the cylinder head;
    a detection space to which the working fluid leaking out through the rod seal is guided; and
    a detecting section configured to detect pressure in the detection space as the detected result,
  the controller has:
    a calculation unit configured to calculate a pressure parameter representing a pressure fluctuation in the detection space due to pressure in the fluid pressure chamber, based on the detected result from the detecting section; and
    a determination unit configured to determine whether or not the leakage of the working fluid has occurred, based on the pressure parameter,
  the pressure parameter includes an upper limit value and a lower limit value of the pressure fluctuation obtained from the detected result detected by the detecting section within a detection period,
  the detecting section further detects a temperature in the detection space, and
  the determination unit calculates the determination value based on the pressure parameter and an integrated value of the temperature in the detection space within the detection period and determines whether or not the leakage of the working fluid has occurred if the determination value is equal to or larger than a determination threshold value, based on the pressure parameter and the integrated value of the temperature, and
  the determination value is calculated such that the determination value becomes larger as the integrated value of the temperature is increased.

8. A fluid leakage detection configured to detect leakage of working fluid in a cylinder device having a piston rod that extends from a cylinder tube and a cylinder head that is provided on the cylinder tube, the piston rod being inserted in the cylinder head so as to have a gap through which the leakage of the working fluid from a fluid pressure chamber in the cylinder tube occurs, the fluid leakage detection system comprising:

a detection unit provided in the cylinder device, the detection unit being configured to detect a pressure of the working fluid leaking out through the gap between the piston rod and the cylinder head;

a controller configured to acquire a detected result from the detection unit; and a relief valve configured to release pressure in the detection space by being opened when the pressure in the detection space reaches a relief pressure value, wherein the detection unit has:

a rod seal provided in the cylinder head, the rod seal being configured to seal the gap between the piston rod and the cylinder head;

a detection space to which the working fluid leaking out through the rod seal is guided; and a detecting section configured to detect pressure in the detection space as the detected result, the controller has:

a calculation unit configured to calculate a pressure parameter representing a pressure fluctuation in the detection space due to pressure in the fluid pressure chamber, based on the detected result from the detecting section;

a determination unit configured to determine whether or not the leakage of the working fluid has occurred, based on the pressure parameter, and the pressure parameter includes an upper limit value and a lower limit value of the pressure fluctuation obtained from the detected result detected by the detecting section within a detection period, and the determination unit determines whether or not the leakage of the working fluid has occurred, based on a difference between the relief pressure value and the lower limit value of the pressure parameter.

* * * * *